United States Patent

Gautney et al.

[15] 3,684,965

[45] Aug. 15, 1972

[54] DIGITALIZED REMOTE CONTROL COMMUNICATIONS SYSTEM

[72] Inventors: George E. Gautney, Annandale; Rowland S. Johnson, Springfield; John Piombino, Annadale, all of Va.

[73] Assignee: Gautney & Jones, Falls Church, Va.

[22] Filed: July 15, 1970

[21] Appl. No.: 55,050

[52] U.S. Cl. ................................325/64, 179/15 BY

[51] Int. Cl. ................................................H04j 1/14

[58] Field of Search .179/15 BY, 84 VF; 325/64, 325

[56] References Cited

UNITED STATES PATENTS 3,510,777 5/1970 Gordon ........................325/64

3,566,270 2/1971 Fukata..........................325/64

*Primary Examiner*—Ralph D. Blakeslee

*Attorney*—Rose & Edell

[57] ABSTRACT

A transmitter, which remotely controls the demuting of a normally muted receiver, derives a command signal from a carrier wave, the command signal having a frequency $f/k_1$ which is a first precise fraction of the frequency $f$ of the carrier wave. The receiver derives from the received carrier wave a reference signal having a frequency $f/K_2$ which is a second fraction of the frequency $f$ of the carrier wave. The receiver also detects the command signal at frequency $f/K_1$ and derives therefrom successive timing intervals $TK_1/f$. The reference signal cycles are counted during the timing intervals and the count should equal $TK_1/K_2$ if the proper command signal has been detected. If this number is counted a control signal is provided for operating a muting/demuting circuit in the receiver. Selective addressing of different receivers can be effected by employing different command signal frequencies for different receivers. In an alternative embodiment, the receivers all respond to the same command signal frequency but respond to different command signal durations. In still another embodiment the receiver derives the timing intervals from the reference signal and counts command signal cycles occuring during these intervals to control the demuting circuit upon appropriate count detection.

19 Claims, 20 Drawing Figures

INVENTORS
GEORGE E. GAUTNEY,
ROWLAND S. JOHNSON
& JOHN PIOMBINO

BY Hurvitz + Rose
ATTORNEYS

PATENTED AUG 15 1972

3,684,965

INVENTORS
GEORGE E. GAUTNEY,
ROWLAND S. JOHNSON
& JOHN PIOMBINO

BY Hurvitz & Rose

ATTORNEYS

INVENTORS
GEORGE E. GAUTNEY,
ROWLAND S. JOHNSON
& JOHN PIOMBINO

BY Hurvitz & Rose

ATTORNEYS

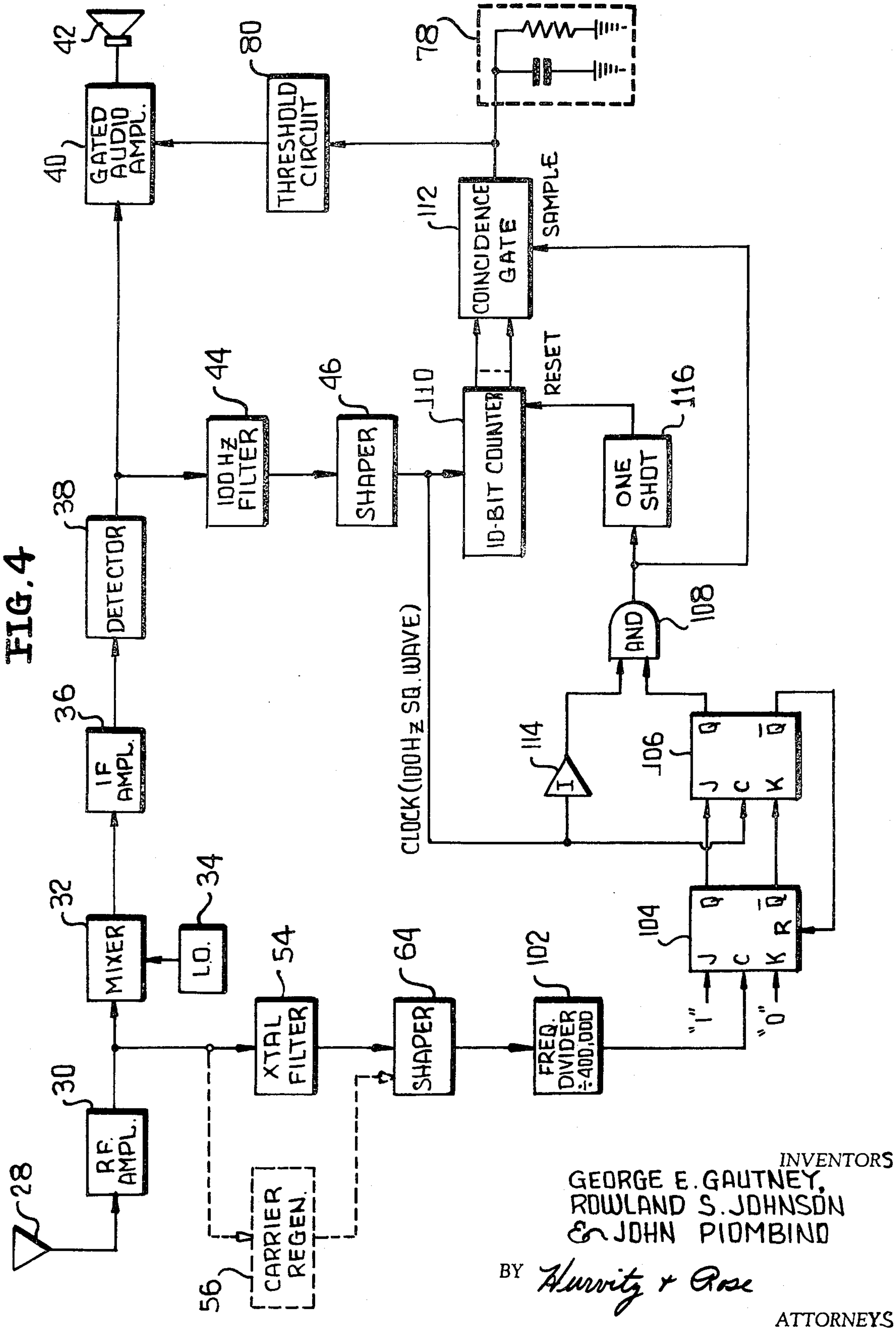
INVENTORS
GEORGE E. GAUTNEY,
ROWLAND S. JOHNSON
& JOHN PIOMBINO
BY Hurvitz & Rose
ATTORNEYS

INVENTORS
GEORGE E. GAUTNEY,
ROWLAND S. JOHNSON
& JOHN PIOMBINO

BY Hurvitz & Rose
ATTORNEYS

DIGITALIZED REMOTE CONTROL COMMUNICATIONS SYSTEM

BACKGROUND OF THE INVENTION

This invention relates to remote control communication systems and, more particularly, to systems in which a transmitted signal includes a command signal component for controlling the demuting of normally muted remote receivers. The invention is applicable to various systems in which selective control of a remote receiver is desired, for instance, selective addressing, two-way radios, telemetry and selective paging systems to mention but a few. For purposes of explanation, however, the present invention is initially discussed in terms of an emergency warning signal.

It has been proposed that a comprehensive emergency warning system include a large plurality of widely dispersed individual receivers located in homes, government offices, schools, and the like. In a system of this character, the receivers are normally muted and respond to an emergency command signal by demuting the receivers and broadcasting warning of the emergency. Since such a system requires many receivers which are normally inactive, it is desirable that the receivers be relatively inexpensive; moreover, the system should be highly reliable. Accordingly, the receivers must be highly insensitive to adjacent frequencies, be very stable, perform capably in the presence of noise, and perform reliably even after extensive idle periods.

There have been a number of prior art approaches to remotely controlling the muting and demuting of receivers. One prior art approach transmits two frequency tones and employs a receiver having narrow band, high Q resonant reed relays. A system of this character is quite secure from false operation and quite sensitive to the demuting signals; however, resonant reed relays of a quality required for a system of this type are too costly for the purpose. Other prior art approaches involving digital techniques have been suggested to avoid the expense of the resonant reed relays; however, these prior art digital approaches have proven to be rather insensitive to the demuting signal and have behaved erratically in the presence of noise.

SUMMARY OF THE INVENTION

It is accordingly a principal object of the present invention to provide a highly reliable, relatively inexpensive remote control communication system.

It is another object of the present invention to provide a remote control radio communication system employing digital techniques, which requires relatively inexpensive components in the receiver, is highly insensitive to spurious signals and noise, is quite stable, and is highly reliable.

A more specific object of the present invention is the provision of a receiver muting/demuting system having the characteristics described in the preceding paragraph.

A further object of the present invention is the provision of means for selectively addressing individual receivers in a multi-receiver system of the type described.

In accordance with one aspect of the present invention, a transmitted carrier wave is modulated by a command signal having a time parameter (for example, frequency) related to a corresponding time parameter of the carrier wave. If desired, this time parameter of the command signal may be provided at selected values whereby to permit selective addressing of one or more remote receivers. Each receiver includes means for deriving a reference signal from the received carrier, which reference signal has a frequency equal to, or is a sub-multiple of, the frequency of a carrier wave. Means are also provided for counting reference signal cycles. The receiver also includes means for detecting the command signal and deriving therefrom a predetermined time interval having a precise relationship to the aforementioned time parameter of the command signal. The number of reference signal timing cycles counted within said predetermined time interval must lie within a relatively small range of numbers if the command signal has been properly detected. If the count does in fact fall within this range of numbers, a control pulse is applied via an integrating circuit to a threshold circuit. If a proper number of reference signal cycles are counted in a predetermined time interval, a control signal is developed to effect demuting of the normally muted receiver.

Selective addressing is effected by employing different command signal frequencies for each receiver. Alternatively, selective addressing is effected by varying the command signal duration for each receiver. In this embodiment, the counting period is equal to the tone duration and each receiver is arranged to sense a different number of counts.

In another embodiment of the present invention the predetermined timing interval at the receiver is derived from the reference signal rather than from the command signal. Cycles of the detected command signal occurring within the reference signal timing interval are then counted, and if a predetermined number of such cycles are counted a control pulse is provided as described above.

BRIEF DESCRIPTION OF THE DRAWINGS

The above and still further objects, features and advantages of the present invention will become apparent upon consideration of the following detailed description of the various specific embodiments thereof, especially when taken in conjunction with the accompanying drawings, wherein:

FIG. 4 is a schematic diagram of a receiver according to another aspect of the present invention;

DESCRIPTION OF THE PREFERRED EMBODIMENTS

Although it is to be understood that the present invention has broad applicability to any remote control system of the type in which a command signal is transmitted to one or more remote receivers for controlling the actuation of apparatus within or near the receivers, the description herein relates specifically to muting/demuting systems in which the command signal serves to control the muting/demuting condition of the remote receiver. In such a system, the command signal is normally absent with the result that the receivers are all maintained in a normally muted condition. However, when it is desired to broadcast an emergency or information signal, a command signal is transmitted by the transmitter and, when detected by the receiver, causes the receiver to switch from a muted to a demuted condition, thereby allowing perception of the incoming emergency or information signal.

Figure 1:
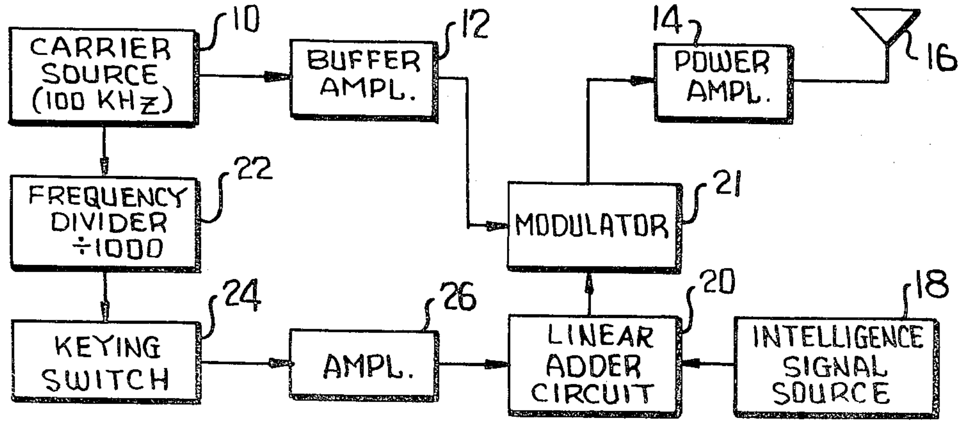
FIG. 1 is a schematic diagram of a transmitter according to the present invention.

Referring specifically to FIG. 1 of the accompanying drawings, a transmitter according to a first embodiment of the invention, includes a source 10 which provides an oscillatory signal at the carrier frequency (which for purposes of the present description only it is assumed to be 100 KHz). The carrier signal is coupled through a buffer amplifier 12 to an amplitude modulator 21. An intelligence signal from intelligence source 18 is applied to a linear adder circuit 20 to which is added a command signal generated in the manner described below. The output signal from adder circuit 20 is applied to modulator 21 at which it amplitude modulates the carrier signal. The modulator output signal is applied to a power amplifier 14 and in turn to a transmitting antenna 16.

The generation of the command signal applied to the linear adder circuit 20 proceeds as follows. The carrier signal is applied from source 10 to a frequency divider 22 which, in turn, provides an output signal at a frequency which is a submultiple of the carrier frequency. For purposes of the present description the division factor of frequency divider 22 is assumed to be 1,000 so that the output signal from the frequency divider is 100 Hz. This output signal is applied to a selectively actuable keying switch 24 which controls application of the signal to an amplifier 26 and, in turn, to the linear adder circuit 20. Modulator 21 amplitude modulates the carrier wave in accordance with both the intelligence signal received from source 18 and the command signal, the latter being of substantially lower amplitude than the intelligence signal. The resulting transmitted signal thus comprises a carrier wave (at 100 KHz) amplitude modulated by an intelligence signal (which might relate to emergency warnings, etc.) and by a command signal (at 100 Hz). Importantly, the frequency of the command signal is a precise function of the carrier frequency, which function is determined by the division ratio of frequency divider 22. In choosing the division ratio of divider 22, it is preferable to provide a command signal frequency below the pass band of the loud-speaker employed in the receiver or receivers being controlled. The reason for this will become clearer upon consideration of the circuit of FIG. 2 described below. It should also be borne in mind that the reliability of the system in the presence of noise is related inversely to the frequency of the command signal. On the other hand, lower frequency command signals slow the response time of the system. It has been found that a 100 Hz command signal frequency represents a good comprise of reliability and response time.

Figure 2:
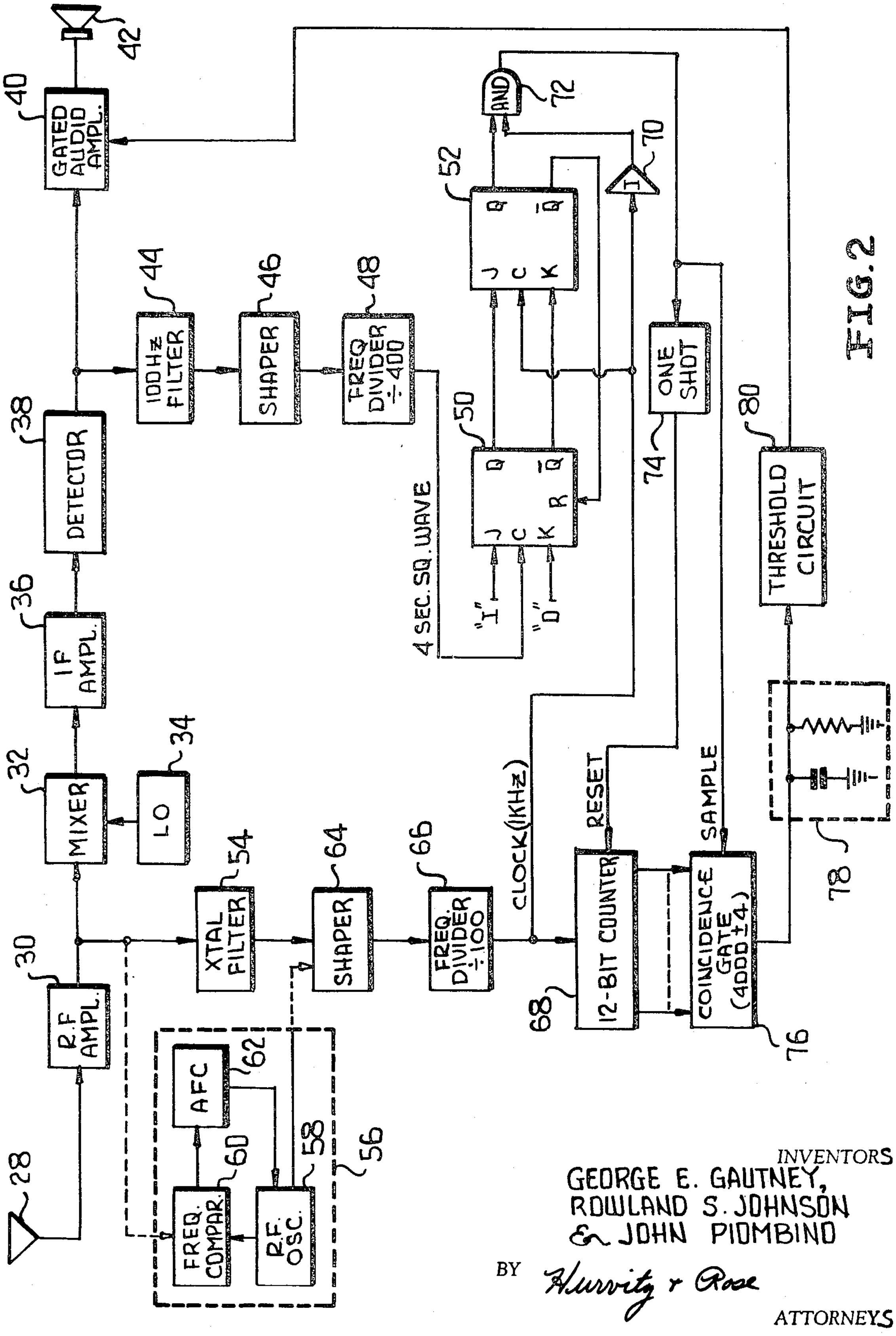
FIG. 2 is a schematic diagram of a receiver according to the present invention for use with the transmitter of FIG. 1.

The signal radiated by transmitting antenna 16 is received by one or more receivers of the type illustrated in FIG. 2. The receiver includes a receiving antenna 28 from which incoming signals are applied to a radio frequency amplifier 30 which is tuned to the frequency of the carrier wave and amplifies the received amplitude modulated carrier signal. This signal is applied to a mixer 32 which also receives a signal from local oscillator 34 to provide an intermediate frequency signal which is amplified by IF amplifier 36. The amplified IF signal is applied to a detector 38 which serves to detect amplitude modulation appearing on the IF signal. The output signal from detector 38 is applied to a gated audio frequency amplifier 40 which, in the absence of a command signal, is biased or switched to prevent coupling of the detected audio signal from detector 38 to loud speaker 42. This is known as the muted condition of the receiver. As is described below, the reception of a command signal, having the proper frequency and duration, results in actuation of gated audio amplifier 40 to permit the detected audio signal to be applied to loud-speaker 42. As a general rule there need not be a high pass filter inserted in series between a detector 38 and gated audio amplifier 40 for purposes of filtering out the 100 Hz command signal. The need for such a filter is obviated by the selection of a loud-speaker 42 having a low frequency cut-off above 100 Hz.

The output signal from detector 38 is also applied to a narrow band filter 44 having its pass band centered on the frequency of the command signal (here assumed to be 100 Hz). The output signal from filter 44 is applied to a pulse shaper network 46 which serves to convert the detected command signal to a train of sharply defined pulses of the same frequency. The pulses provided by shaper 46, at 100 Hz, are applied to a frequency divider 48 having a frequency division ratio of 400. Thus, the output signal from frequency divider 48 is a square wave having a four second period. This square wave is applied to the clock input terminal C of a clocked J-K flip-flop 50. A binary "1" signal is permanently applied to the J input terminal of flip-flop 50 and a binary "0" signal is permanently applied to the K input terminal. For purposes of the present description a binary "1" level is considered more positive than the binary "0" level. The operational characteristics of flip-flop 50 may be briefly described as follows: Upon each transistion from binary "1" to binary "0" at the clock input terminal C, flip-flop 50 assumes a state determined by the signals applied to input terminals J and K; if binary "1" is applied to terminal J and a binary "0" applied to terminal K, flip-flop 50 is placed in its set state wherein it provides a binary "1" signal at its Q output terminal and a binary "0" at its $\bar{Q}$ output terminal. If the binary levels at terminals J and K were opposite those shown, at the time of transistion from binary "1" to binary "0" at terminal C, the flip-flop would be reset wherein the binary levels of the signals at terminals Q and $\bar{Q}$ would be "0" and "1" respectively. In addition a reset terminal R responds to a binary "0" applied thereto to place flip-flop 50 in its reset mode, this condition having an over-riding effect on any clocking of the flip-flop which might simultaneously occur as a result of signals applied to terminals C, J and K. The Q and $\bar{Q}$ signals from flip-flop 50 are applied to terminals J and K respectively at flip-flop 52, the latter being of substantially the same type as flip-flop 50.

The output signal from RF amplifier 30 is also applied to a crystal filter 54 employed to pass the carrier frequency (here assumed to be 100 KHz). It is important that filter 54 have a very narrow band and a very high Q so that only the carrier frequency is passed thereby. High quality filters of this type are relatively expensive; therefore it is also possible as shown in dashed lines in FIG. 2, to employ a less costly carrier regenerator circuit 56. The latter includes an RF oscillator 58 designed to have an output frequency at least closely approximating the carrier frequency. In fact, it is the purpose of circuit 56 to insure that the output frequency of oscillator 58 is slaved to the carrier frequency. To this end the output signal from RF amplifier 30 may be connected to frequency comparator 60 which also receives the output signal from oscillator 58. Frequency comparator 60 develops an error signal corresponding to the difference in frequency between the carrier and the signal from oscillator 58. This error signal controls an automatic frequency control circuit 62 which adjusts the frequency of oscillator 58 until the error signal from comparator 60 is nulled. Whereas carrier regenerator circuit 56 is less costly and less sensitive to noise then crystal filter 54, it does have the disadvantage of possibly locking on to a frequency other than the carrier frequency but located closely adjacent thereto. Under such circumstances inaccurate response will be effected at the receiver. Nevertheless, either method of providing a signal having a frequency of the carrier wave may be employed.

The output signal from filter 54 (or from circuit 56) is applied to a pulse shaper circuit 64 which responds by providing a train of well-shaped output pulses at the carrier frequency. These pulses are applied to a frequency divider circuit 66 having a frequency division ratio of 100. The output signal from frequency divider 66 is therefore a square wave having a frequency of 1 KHz which serves as a reference clock signal for the receiver. Importantly, this signal is frequency-locked to the frequency of the received carrier signal.

Cycles of the 1 KHz reference clock provided by frequency divider 66 are counted in a 12-bit binary counter 68. The reference clock is also applied to the clock input terminal C of flip-flop 52 and to a logic inverter element 70. During each binary "0" portion of the clock cycle the output signal from inverter 70 is applied as a binary "1" input signal to a two-input AND gate 72, the second input being supplied by the Q output terminal of flip-flop 52. The $\bar{Q}$ output terminal of flip-flop 52 is applied to the reset terminal R of flip-flop 50.

The output signal from AND gate 72 triggers a one-shot multivibrator 74 which responds to negative-going edges of pulses applied thereto to provide a reset pulse having a width on the order of 100 $\mu$s. This reset pulse is applied to counter 68 to reset the latter to zero. The output signal from AND gate 72 is also applied as a sample signal to a coincidence gate 76. The latter receives signals from appropriate bits in counter 68 such that receipt of a SAMPLE pulse in time coincidence with a count of 4,000 ± 4 at counter 68 causes gate 76 to provide an output pulse. Output pulses from coincidence gate 76 are applied to an integrator circuit 78 and in turn to a threshold circuit 80. When the input signal from threshold circuit 80 reaches a specified value, the threshold circuit provides an output signal to gated audio amplifier 40 which serves to demute the amplifier and permit coupling of the detected audio signal to loud-speaker 42.

Figures 3A, 3B, 3C, 3D, 3E, 3F, 3G:
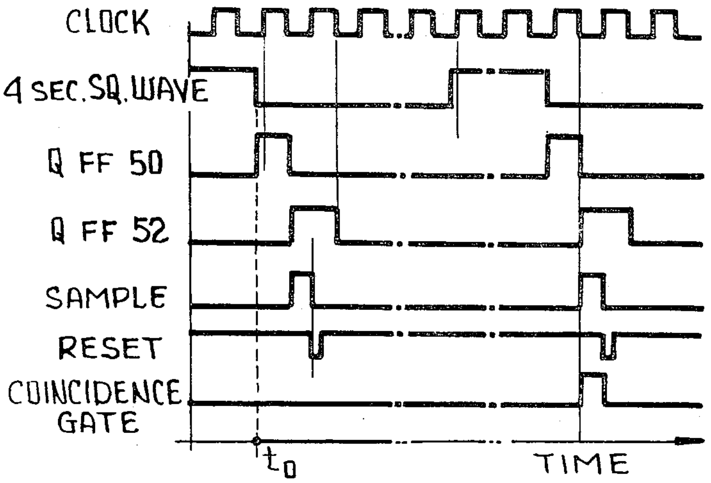
FIGS. 3*a* and 3*g* are timing diagrams representing respective signals present in the receiver circuit of FIG. 2.
Figure 3:
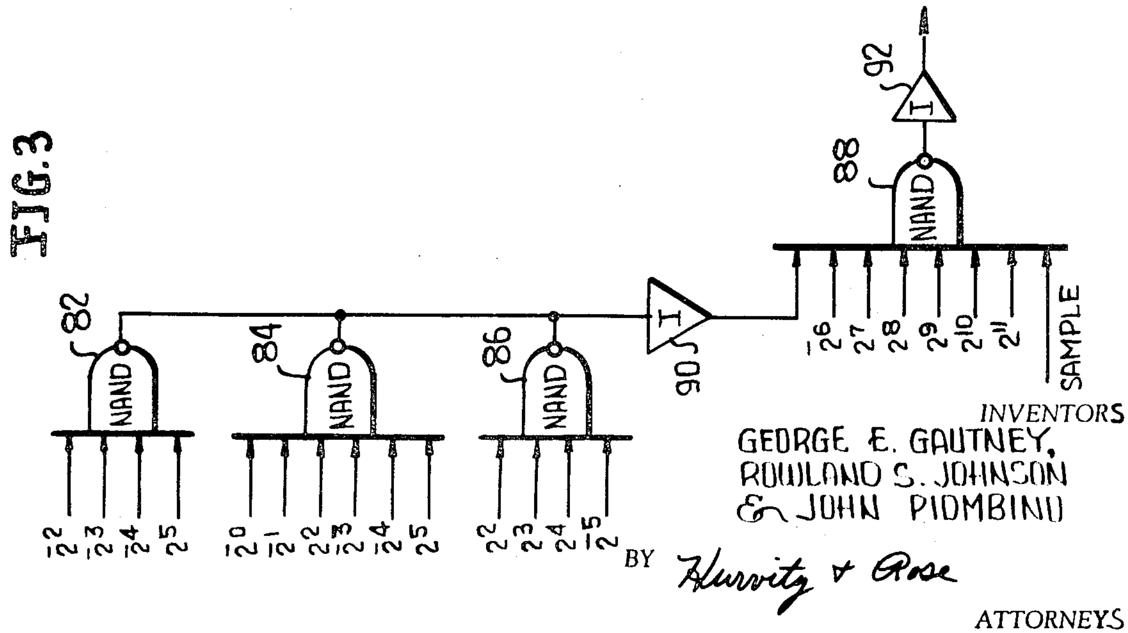
FIG. 3 is a schematic diagram of a coincidence gate employed in the receiver of FIG. 2.

Before going into a detailed description of the operation of the circuit of FIG. 2, reference is made to FIG. 3 in which an example of an embodiment of coincidence gate 76 is provided. The coincidence gate comprises two four-input NAND gates 82 and 86, a six-input NAND gate 84, and an eight-input NAND gate 88. In addition two logic inverters 90 and 92 are provided. The four-input signals applied to NAND gate 82 from counter 68 are $\overline{2^2}$, $\overline{2^3}$, $\overline{2^4}$ and $2^5$; NAND gate 86 receives as input signals $2^2$, $2^3$, $2^4$ and $\overline{2^5}$; NAND gate 84 receives the signals $\overline{2^0}$, $\overline{2^1}$, $2^2$, $\overline{2^3}$, $\overline{2^4}$ and $2^5$. The output signals from NAND gates 82, 84 and 86 are connected together to a common junction and are applied to logic inverter 90. NAND gates 82, 84 and 86 are of such type that the common connection of their output terminals provides a wired-OR configuration whereby a binary "0" from any of gates 82, 84 and 86 renders the common junction binary "0". The input signals applied to NAND gate 88 include the output signal from inverter 90, the SAMPLE pulse from AND gate 72 in FIG. 2, as well as the following signals from counter 68: $\overline{2^6}$, $2^7$, $2^8$, $2^9$, $2^{10}$, $2^{11}$. The output signal from NAND gate 88 is applied to logic inverter 92 which, in turn, provides the output signal from the coincidence gate 76.

Examining the six input signals applied to NAND gate 88 from counter 68, it is readily perceived that all of these signals will be binary "1" when the count in counter 68 reaches 3,996; further these bits all remain binary "1" until count 4,060 appears in counter 68. Assuming the presence of a binary "1" SAMPLE pulse, in order for the output signal from NAND gate 88 to be binary "0" only in the range of counts between 3,996 and 4,004 as required, the output signal from logic inverter 90 must be binary "1" for this range of counts. In this regard NAND gate 86 is binary "0" for counts 3,996 through 3,999; NAND gate 82 is binary "0" for counts 4,000 through 4,003; and NAND gate 84 is binary "0" for count 4,004. Since the input signal to inverter 90 is binary "0" whenever any one of NAND gates 82, 84 and 86 is binary "0", the output signal from logic invertor 90 is binary "1" over the entire range of counts 3,996 though 4,004. Of course inverter 90 is binary "1" for other counts, outside the range of 3,996–4,060, but gate 88 is otherwise inhibited for these counts.

Operation of the receiver of FIG. 2 will now be described with reference to the timing diagrams of FIGS. 3a through 3g. If it is assumed for the moment that the keying switch 24 of FIG. 1 is not actuated, no command signal amplitude modulates the carrier signal and consequently no command signal is detected by detector 38; likewise the four second square wave is not applied to the clock terminal C of flip-flop 50. It is assumed further that flip-flops 50 and 52 are both reset, an assumption which is in fact true, as will be apparent from the subsequent description. Under the assumed conditions, the 100 KHz carrier received at antenna 28 and amplified by amplifier 30 is passed through filter 54 (or regenerator circuit 56), shaped at shaper 64 and divided by frequency divider 66 to provide the 1 KHz reference clock. Transitions in this clock signal from binary "1" to binary "0" have no effect at flip-flop 52 because the J and K input terminals of that flip-flop are receiving binary "0" and binary "1" signals, respectively, from the Q and $\bar{Q}$ terminals of flip-flop 50 in its reset state. Under such circumstances flip-flop 52 remains reset. Moreover, the binary "1" signals applied to AND gate 72 from logic inverter 70 during the binary "0" half-cycles of the reference clock have no effect because AND gate 72 is maintained binary "0" by the binary "0" Q output signal of flip-flop 52. Consequently one-shot multivibrator 74 is not triggered and coincidence gate 76 is not sampled. Counter 68 continues to count, and upon reaching its maximum count of 4,096 spills over and begins again. This condition continues until a 100 Hz command signal is detected and passed through filter 44, at which time the four second square wave output signal from frequency divider 48 is initiated. Upon the first negative going transition (from binary "1" to binary "0") of this square wave, occurring at $t_0$ in FIG. 3*b*, flip-flop 50 is switched to its set state whereby a binary "1" signal is provided at its Q output terminal and a binary "0" signal is provided at its $\bar{Q}$ output terminal. The next occurring transition from binary "1" to binary "0" of the 1 KHz clock in FIG. 3*a* switches flip-flop 52 from its reset state to its set state whereby a binary "1" signal is provided at its Q output terminal and a binary "0" at its $\bar{Q}$ output terminal. The binary "0" $\bar{Q}$ signal of flip-flop 52 resets flip-flop 50 at this time. In addition the binary "1" Q signal of flip-flop 52 enables AND gate 72 which switches to the binary "1" state for the duration of the current binary "0" half-cycle of the 1 KHz clock. In the binary "1" state AND gate 72 provides a SAMPLE pulse, as illustrated in FIG. 3*e*, to coincidence gate 76. If at this time the count in counter 68 is in the range between 3,996 and 4,004, the coincidence gate 76 provides an output pulse (FIG. 3*g*) of width substantially equal to the SAMPLE pulse width. However, for the first cycle of the four second square wave of FIG. 3*b* after receipt of the command signal, the count in counter 68 is at some random level and only by chance will it fall within the prescribed range. Under these circumstances coincidence gate 76 does not provide an output pulse. At termination of the SAMPLE pulse, one-shot multivibrator 74 is triggered to reset the count in counter 68 and on the next occurring transition in the 1 KHz clock from binary "1" to binary "0", flip-flop 52 is reset by the binary "1" signal applied to its K input terminal from the $\bar{Q}$ output terminal of flip-flop 50.

Following the resetting of flip-flop 52, the only wave form in FIGS. 3*a* through 3*g* which continues to change is the 1 clock. The clock cycles are counted by the 12-bit counter 68 until the next transition from binary "1" to binary "0" of the four second square wave of FIG. 3*b*. Once again this transition sets flip-flop 50 which then permits flip-flop 52 to be set by the next transition of the 1 KHz clock from binary "1" to binary "0". When flip-flop 52 is set the SAMPLE pulse is generated and if, as assumed here, the count in counter 68 is in the range of 3,996 to 4,004, the coincidence gate 76 provides an output pulse substantially in time-coincidence with the SAMPLE pulse. At the termination of the SAMPLE pulse the counter is reset and the cycle begins again. A coincidence gate output pulse is then provided after each cycle of the 4 second square wave as long as the command signal is detected. Output pulses from coincidence gate 76 are applied to integrator circuit 78 which has a short charge period so that one pulse is sufficient to trigger threshold circuit 80. The latter responds by biasing gated audio amplifier 40 on, and the intelligence signal detected by detector 38 is passed to loud-speaker 42. The charge time constant of the RC circuit in integrator 78 can be chosen such that any predetermined number of successive coincidence gate pulses (at four second intervals) are required to exceed the threshold voltage of circuit 80. Likewise integrator 78 holds its charge for a specified period of time, for example 12 seconds, after coincidence gate pulses are terminated thereby maintaining amplifier 40 in its on condition for that period of time.

It is to be noted that if the command signal is not at the proper frequency to be passed by filter 44 the four second square wave cannot be generated and consequently no coincidence gate output pulses are provided. Under such circumstances the gated audio amplifier 40 is maintained off. If an improper signal is detected by detector 38, having a frequency within the pass band of filter 44 but not precisely at 100 Hz, the square wave provided by frequency divider 48 will not have a 4 second period. Consequently, the period between reset pulses at counter 68 will be other than seconds and a count of 4,000 ± 4 would not be coincident with the SAMPLE pulse. Under such circumstances the coincidence gate does not provide an output pulse and gated amplifier 40 is maintained off.

Selective addressing of different receivers of the type illustrated in FIG. 2 is readily accomplished by employing command signals of different frequencies. More specifically, the transmitter of FIG. 1 can employ a plurality of dividers like frequency divider 22, each dividing the carrier frequency by a different factor. The signal from each divider could then be selectively keyed by additional switches and amplified by amplifier 26. For this approach to selective receiver addressing, filter 44 would have to be different for each receiver. It is possible to avoid the necessity of providing each receiver with a different filter and still obtain selective addressing of the different receivers. An embodiment for achieving this result is described below with reference to FIGS. 6 and 7.

Referring now to FIG. 4 of the accompanying drawings there is illustrated another receiver embodiment of the present invention comprising a receiver antenna 28, RF amplifier 30, mixer 32, local oscillator 34, IF amplifier 36, detector 38, gated audio amplifier 40, and loud-speaker 42, all connected and operative in substantially the same manner as described for the receiver of FIG. 2. In addition, the output signal from RF amplifier 30 is applied to a crystal filter 54 (or alternatively to a carrier regenerator circuit 56) tuned to the carrier frequency which in turn applies its output signal to a pulse shaper circuit 64. The output signal from detector 38 is applied to a narrow band filter 44 at the same frequency as the command signal, and in turn to shaper 46. To this point, the circuit of FIG. 4 is identical to the circuit of FIG. 2. The significant difference in the approach of FIG. 4, however, resides in the face that the 4 second wave is derived from the carrier signal rather than the command signal, and cycles of the detected command signal rather than the reference signal are counted. More specifically, the 100 KHz pulse train provided by shaper 64 is applied to a frequency divider having a frequency division ratio of 400,000. The resulting output signal from frequency divider 102 is applied to the clock input terminal C of flip-flop 104. Flip-flop 104 and flip-flop 106, to be described subsequently, are of the same general configuration as flip-flop 50 of FIG. 2. Binary "1" and binary "0" input signals are permanently applied to input terminals J and K respectively of flip-flop 104 and the reset input terminal of flip-flop 104 is connected to the $\bar{Q}$ output terminal of flip-flop 106. The Q and $\bar{Q}$ output terminals of flip-flop 104 are applied to the J and K input terminals respectively of flip-flop 106. The Q output terminal of flip-flop 106 is applied to two-input AND gate 108.

The output signal of pulse shaper 46 comprises a clock signal in the form of a 100 Hz square wave. This signal is applied directly at a 10-bit counter 110 having selective output bits connected to a coincidence gate 112. In addition the 100 Hz clock is applied to the clock input terminal C of flip-flop 106 and to logic inverter 114 which has an output terminal connected to the second input terminal of AND gate 108. The output signal of AND gate 108 comprises the SAMPLE pulse applied to coincidence gate 112 and is also applied to one-shot multivibrator 116 which responds to the trailing edge of the SAMPLE pulse to provide a reset pulse for resetting the 10-bit counter 110. The output signal from coincidence gate 112 is applied to integrator circuit 78 and threshold circuit 80 to provide an output signal to the gated audio amplifier 40 whenever the threshold circuit input signal is exceeded.

The operation of the receiver of FIG. 4 is best understood in conjunction with FIGS. *5a* through *5g* wherein timing diagrams of various signals in FIG. 4 are illustrated. For this receiver it is the four second square wave provided by frequency divider 102 which continuously alternates as long as the carrier is received, and the 100 Hz clock is present only when the 100 Hz command signal is detected. The reference time period of 4 seconds should produce a count of 400 ± 1 in counter 110. Consequently, following the principles illustrated in FIG. 3, interconnections between counter 110 and gate 112 are selected to provide a coincidence pulse if the SAMPLE pulse is time coincident with a 400 ± 1 count. Assume initially that flip-flops 104 and 106 are both reset and that no command signal is detected by detector 38; it is noted at the first transition from binary "1" to binary "0" of the 4 second square wave in FIG. *5a* that flip-flop 104 is set by the binary "1" signal applied to terminal J. Flip-flop 106 remains reset however since its 100 Hz clocking signal cannot be provided in the absence of a detected command signal. Thus flip-flop 104 remains set, as illustrated in FIG. *5c*, and flip-flop 106 remains reset, as illustrated in FIG. *5d*, until such time as a command signal is detected.

Assuming now that a command signal is in fact detected, the 100 Hz square wave clock is initiated. Upon the first transition from binary "1" to binary "0" of this clock, flip-flop 106 is set by the binary "1" signal applied to its J input terminal. Upon becoming set, flip-flop 106 immediately resets flip-flop 104 and also enables AND gate 108. The latter provides an output pulse of width equal to the binary "0" half cycle of the 100 Hz clock. This binary "1" output pulse from AND gate 108 serves as the SAMPLE pulse applied to the coincidence gate 112. Since the first transition from binary "1" to binary "0" of the 100 Hz clock is the one which initiates the setting of flip-flop 106 and the generation of the SAMPLE pulse from AND gate 108, there ordinarily will not be a count of 400 ± 1 in 10-bit counter 110. Under such circumstances coincidence gate 112 does not provide an output pulse. However the SAMPLE pulse also triggers one-shot multivibrator 116 to provide a relatively narrow reset pulse which resets counter 110. The latter now begins to count cycles of the 100 Hz clock as long as the 100 Hz command signal is detected by detector 38.

Figures 5A, 5B, 5C, 5D, 5E, 5F, 5G:
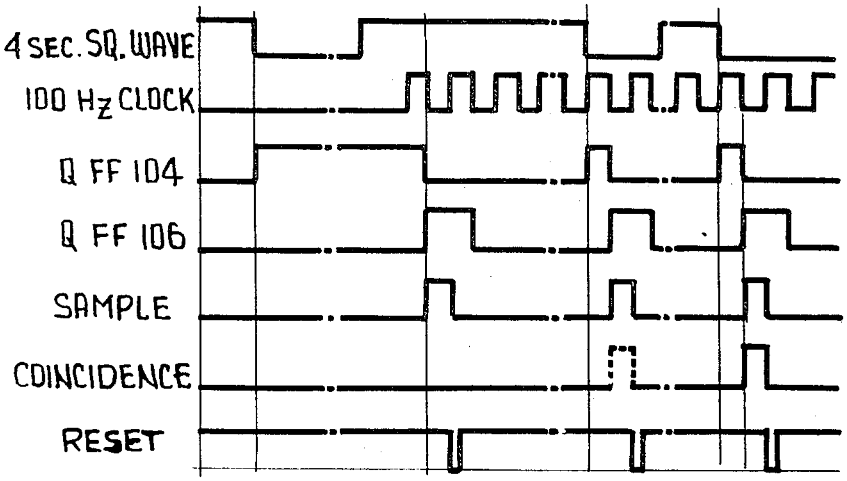
FIGS. 5*a* through 5*g* are timing diagrams representing various signals present in the circuit of FIG. 4.

At the next transition from binary "1" to binary "0" of the four second square wave, in FIG. 5 *a*, flip-flop 104 is set. Flip-flop 106 is then set upon the next occurring transition from binary "1" to binary "0" in the 100 Hz clock of FIG. *5d*. Upon the setting of flip-flop 106 another sample pulse is generated. At this time it is by no means certain that the count in 10-bit counter 110 will be 400 ± 1. The reason for this is that the initial appearance of the detected command signal may have occurred anywhere within the previous four seconds. Since counter 110 is counting 100 Hz clock cycles it can only have a count of 400 ± 1 if in fact its counting period is approximately 4 seconds. Therefore an output pulse from coincidence gate 112 occurs at this time only if the command signal is initially detected at or about the time the four second square wave of FIG. *5a* experiences a binary "1" to binary "0" transition. Regardless of whether a coincidence gate output pulse is generated, another counter reset pulse is triggered by the SAMPLE pulse and a complete counting cycle is now initiated.

The next negative-going transition of the four second square wave in FIG. *5a* again sets flip-flop 104. Flip-flop 106 is then set by the next negative-going transition of the 100 Hz clock. Setting of flip-flop 106 enables AND gate 108 to provide a SAMPLE pulse which now assuredly arrives at coincidence gate 112 in time coincidence with a count of 400 ± 1 in counter 110, assuming of course that a proper command signal has been detected. The resulting coincidence gate output pulse is applied to integrator circuit 78 which in turn triggers threshold circuit 80. Once threshold circuit 80 is triggered the gated audio amplifier is turned on to permit passage of the intelligence signal from detector 38 to loud-speaker 42.

Figure 7:
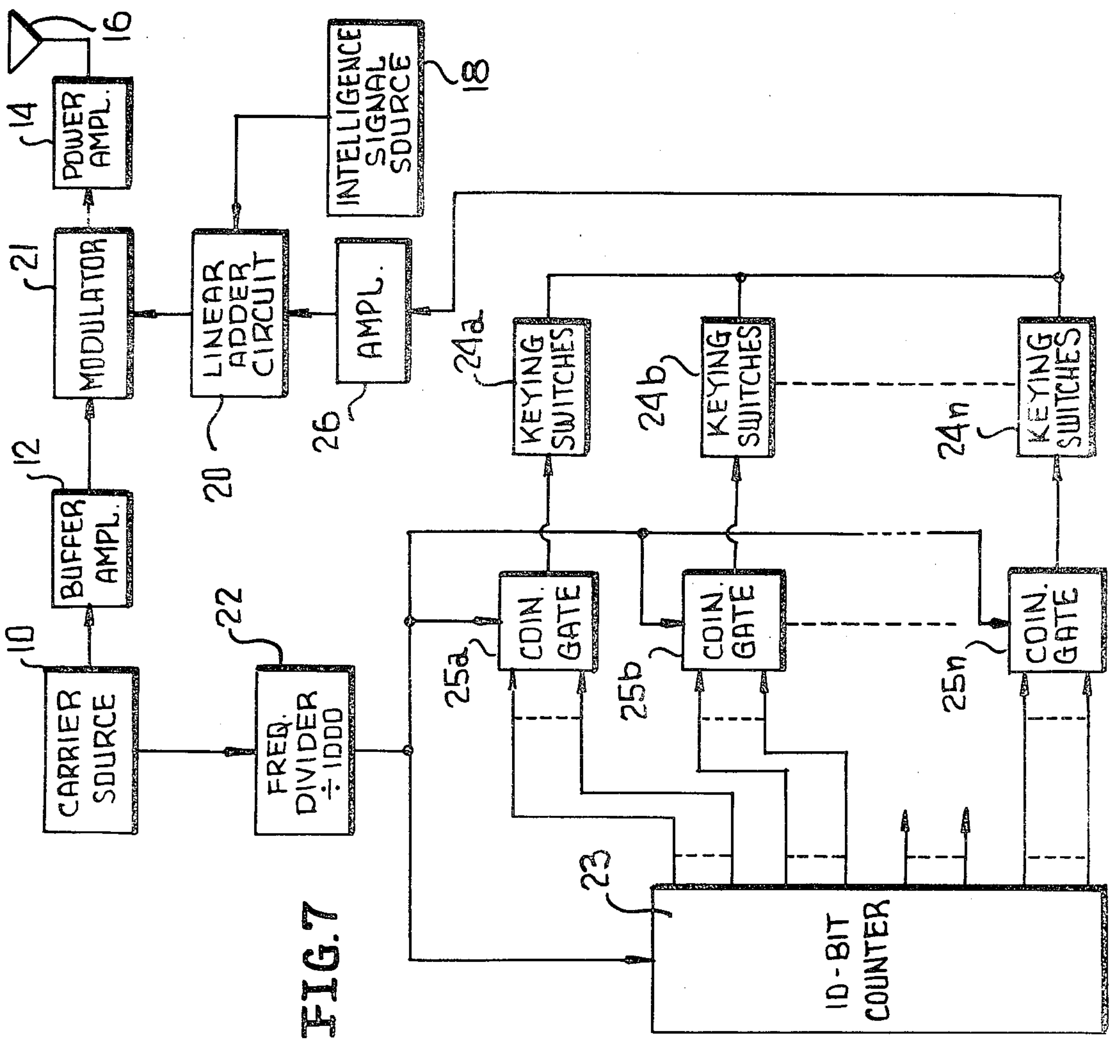
FIG. 7 is a schematic diagram of a transmitter for use with the receiver of FIG. 6.

Selective addressing of the receivers of FIGS. 2 and 4 may be accomplished by employing different command signal frequencies for each addressed receiver. Thus, filter 44 in each of FIGS. 2 and 4 will have a different pass frequency in each receiver, and a number of additional frequency dividers, corresponding to divider 22 in the transmitter of FIG. 1 will be associated with respective keying switches, similar to switch 24 in FIG. 1, to selectively apply a command signal of a desired frequency to the carrier. While this approach to selective addressing of the receivers is quite workable, it does require a different filter for each receiver. An approach to selective receiver addressing wherein identical filters are employed in each of the receivers is illustrated in FIGS. 6 and 7.

Figure 6:
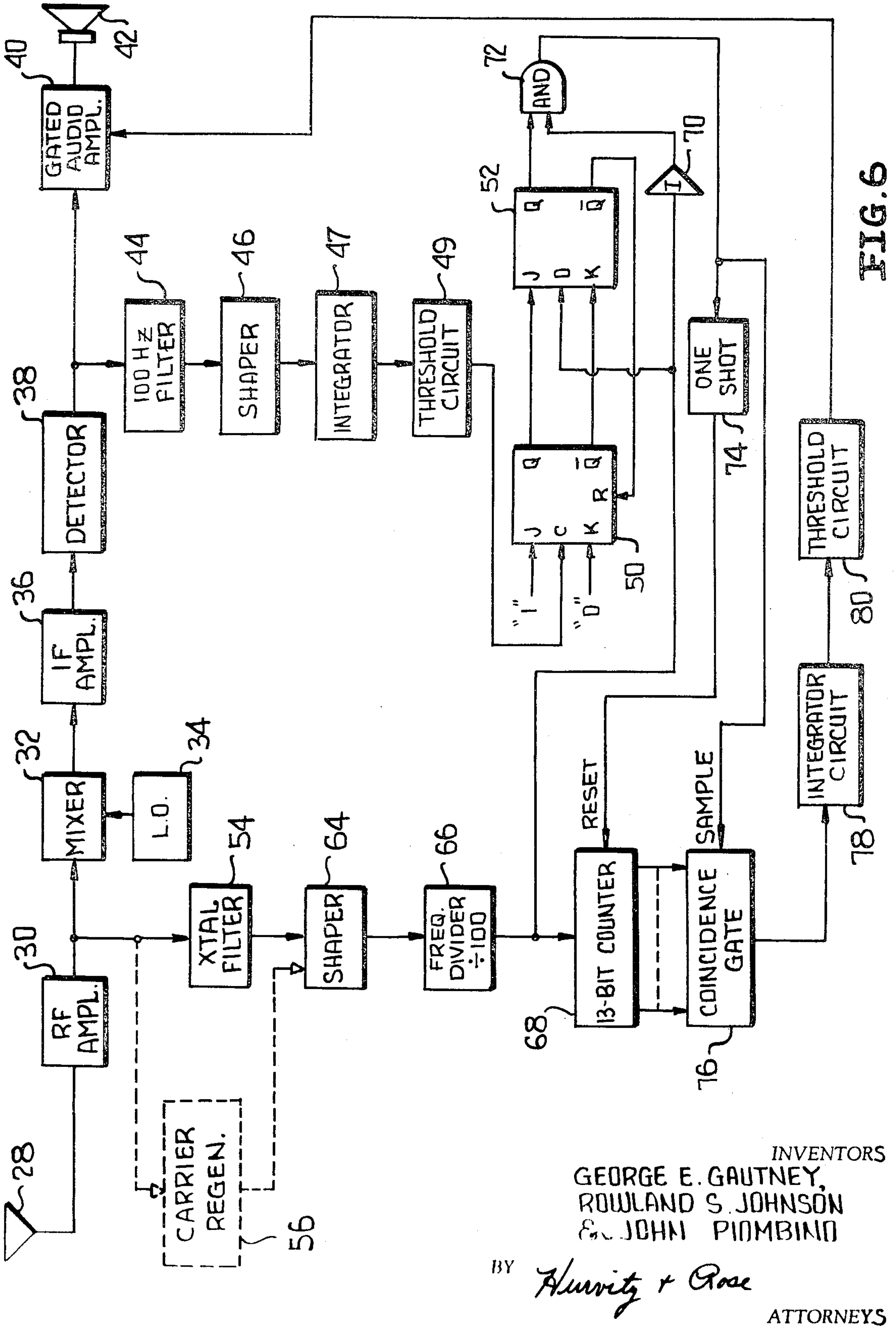
FIG. 6 is a schematic diagram of a receiver according to still another aspect of the present invention.

Referring specifically to FIG. 6 of the accompanying drawings there is illustrated a receiver of the type illustrated in FIG. 2 but modified to permit selective addressing without variation of the command signal frequency. The approach employed for selective addressing in FIG. 6 is to utilize the duration for which the command signal modulates the carrier as the means for selecting which receiver is to be demuted. The receiver of FIG. 6 shall be described first; after which a modified transmitter for permitting selective variation of command signal duration will be described in relation to FIG. 7.

The receiver of FIG. 6 is substantially identical to the receiver of FIG. 2 with the exception that frequency divider 48 in the detected command signal path has been replaced by an integrator circuit 47 and a threshold circuit 49. In addition, counter 68 should have 13-bits. Apart from these changes the remaining components of the receiver of FIG. 6 are substantially identical to the components of FIG. 2 and are interconnected in substantially the same manner. Integrator 47 acts primarily as a holding circuit to provide an output voltage whenever the 100 Hz command signal, detected by detector 38, initiates the pulse train from shaper 46. Integrator circuit 47, in this regard, has a relatively short charge and discharge time interval relative to the period of the 100 Hz pulse train. Upon receipt of the first pulse at integrator 47, threshold circuit 49, which when inactive applies a binary "1" signal to the clock input terminal of flip-flop 50, switches its output signal to binary "0". This condition obtains until such time as the integrator circuit 47 no longer provides an output signal. The latter time coincides within one cycle of the disappearance of the 100 Hz pulse train from shaper 46.

Receivers of the type illustrated in FIG. 6, when employed in a multi-receiver remote control system, all employ substantially identical components of the type illustrated in FIG. 6. Various receivers in the system will differ however by virtue of the interconnections between 12-bit counter 68 and coincidence gate 76. The count in counter 68 at which a SAMPLE pulse is to actuate coincidence gate 76 is determined by the time interval during which the carrier signal is modulated by the command signal. More specifically, for the carrier frequency of 100 KHz and command signal of frequency 100 Hz, assume that the bits connected to the coincidence gate 76 correspond to count 6,000 in counter 68. At a 1 KHz counting rate, 6 second counting intervals are required to reach a count of 6,000. If the 100 Hz command signal is applied to the carrier for a three second on three second off repeated cycle, operation proceeds in the following manner. Upon receipt of the first pulse of the 100 Hz pulse train from shaper 46, integrator circuit 47 triggers threshold circuit 49 to clock flip-flop 50 in a manner similar to that described for FIG. 2. Clocking of flip-flop 50 results in the sampling of coincidence gate 76 and resetting of bit counter 68. Sampling of coincidence gate 76 should not produce an output pulse at this time since initial detection of the command signal by detector 38 is randomly related, in time, to the count in counter 68. After counter 68 is reset by the pulse from one-shot multivibrator 74, counting of the 1 KHz clock from frequency divider 66 proceeds in the usual manner. Three seconds after initial detection of the command signal, its presence as modulation on the carrier is terminated, thereby terminating the pulse train from shaper 46. Within one cycle integrator 47 discharges and threshold circuit 49 provides a binary "1" output signal. Since flip-flop 50 is clocked only on a transition from binary "1" to binary "0", flip-flop 50 is not clocked at this time. Therefore both of flip-flops 50 and 52 remain in their reset state. After passage of another three seconds (6 seconds after the initial detection of the command signal by detector 38), the command signal reappears and the output pulse train from shaper 46 is reinitiated. Integrator 47 responds by triggering threshold circuit 49 to once again provide a binary "0" at the clock input terminal C flip-flop 50. The latter is clocked to its set state and, as described above, eventually results in the application of a sample pulse to coincidence gate 76. The count in counter 68 at this time should be 6,000 because 6 seconds of counting 1 KHz cycles have elapsed since the last time counter 68 was reset. Actually, using the techniques employed for the coincidence gate of FIG. 3, a range of 6,000 ± 6 counts can be employed within which the sample pulse can trigger coincidence gate 76. If the count in counter 68 is the proper range, the coincidence gate provides an output pulse to integrator circuit 78 to in turn trigger threshold circuit 80, whereby to gate on the gated audio amplifier 40.

After sampling of coincidence gate 76, counter 68 is reset to permit initiation of another counting cycle. As long as the command signal continues to be provided for a three second on three second off cycle, coincidence gate 76 provides a pulse once every 6 seconds. When the command signal is turned off entirely, pulses from coincidence gate 76 are no longer provided and integrator circuit 78 maintains threshold circuit 80 activated for a short period of time (10 to 12 seconds, typically) after which audio amplifier 40 is once again switched to its locking mode to prevent coupling of the intelligence signal to loud-speaker 42.

The same principles described immediately above are applicable to render another receiver of the type illustrated in FIG. 6 responsive to a 4 second on 4 second off command signal by sensing a count of 8,000 in counter 68 at coincidence gate 76. Likewise an *n*-second on *n*-second off command signal may actuate a receiver in which the coincidence gate 76 is arranged to sense a count of 1,000.2*n* at counter 68.

As described above the receiver of FIG. 6 responds only to a command signal which is on for a predetermined period of time and off for that same predetermined period of time. With a slight modification at threshold circuit 49 the on time and off time need not be equal. More specifically, if threshold circuit 49 is arranged to provide a negative-going or binary "0" pulse each time the output circuit from integrator 47 changes, flip-flop 50 is clocked both at the start and finish of the command signal on time. The counting interval for counter 68 under these circumstances is merely the on time for the command signal and not the on time and off time combined. Thus, if the connections between counter 68 and coincidence gate 76 are such to permit the latter to respond to a count of 1,000.2n, the following operation occurs. Upon initial detection of the 100 Hz command signal integrator 47 triggers threshold circuit 49 to provide a negative-going pulse to which clocks flip-flop 50. In the manner described above, a SAMPLE pulse is applied to coincidence gate 76 which is normally not actuated at this time. Following the SAMPLE pulse counter 68 is reset by one-shot multivibrator 74 and the counting cycle begins. The counting cycle is terminated upon termination of the command signal. Thus if the command signal is of *n* seconds duration, at the command signal termination the level of the output signal from integrator 47 falls, and threshold circuit 49 responds by providing another negative-going clock pulse to the C input terminal of flip-flop 50. The latter is once again set resulting in the generation of a SAMPLE pulse at coincidence gate 76. The concurrence of the SAMPLE pulse and a count of $1000 \times n \pm 1$percent at counter 68 causes coincidence gate 76 to provide an output pulse and thereby gate on amplifier 40 by means of integrator circuit 78 and threshold circuit 80. Clearly, in this mode of operation the off time of the command signal need not be equal to the on time since the counting interval for counter 68 is determined solely by the duration of the on time of the command signal. The only requirement, however, for the off time of the command signal is that it not be so large as to permit integrator circuit 78 to discharge below the threshold of circuit 80 between on-time periods and thereby permit threshold circuit 80 to deactivate the gated audio amplifier 40.

A transmitter suitable for providing selective on and off times for different receivers of the type of FIG. 6 is illustrated in schematic form in FIG. 7. The transmitter of FIG. 7 includes a carrier source 10, buffer amplifier 12, modulator 21, power amplifier 14, antenna 16, intelligence signal source 18, linear adder circuit 20, amplifier 26, and frequency divider 22 of substantially the same type, and interconnected in substantially the same manner, as described in relation to FIG. 1. The transmitter of FIG. 7 differs from that of FIG. 1 in the manner in which the 100 Hz output signal from frequency divider 22 is selectively keyed. To this end the 100 Hz output signal from divider 22 is applied to a 10-bit binary counter 23 and also to each of *n* coincidence gates 25*a* through 25*n*. These coincidence gates are of the same general type and operate under the same general principles as the coincidence gate illustrated in FIG. 3. Each receives signals from respective bits of counter 23 as well as the 100 Hz signal from frequency divider 22. The output of each coincidence gate is connedted to a respective keying switch 24*a* through 24*n* having output terminals connected in common and to amplifier 26.

The input signals from counter 23 to the various coincidence gates 25*a* through 25*n* determine precisely when an output pulse from frequency divider 22 is capable of gating the coincidence gates on. For example, gate 25*a* may be connected to those bits in counter 23 which provide a one second on period and a one second off period continuously for gate 25*a*. Under such circumstances 100 successive pulses from frequency divider 22 will gate coincidence gate 25*a* on and the next 100 pulses will gate coincidence gate 25*a* off. In like manner the interconnections from counter 23 to coincidence gate 25*a* may cause coincidence gate 25*a* to turn on in response to 100 Hz pulses from divider 22 and remain off in response to the next 200 or 300 of such pulses. In like manner each of coincidence gates 25*a* through 25*n* can be made to respond to any number of successive pulses from frequency divider 22 and not respond to any number of succeeding pulses from frequency divider 22. Depending which of keying switches 24*a* through 24*n* is actuated, the command signal having a selected on off cycle is passed to amplifier 26 in turn to adder circuit 20 to modulate the carrier at modulator 21.

It should be stressed that the receiver of FIG. 6, even though it responds to the same command signal frequency as all other receivers in the multi-receiver system, does not so respond unless the on time of the command signal corresponds to that determined by the interconnections between counter 68 and coincidence gate 76 in that particular receiver. Specifically, for all command signal durations other than that to which the receiver is to respond, the command signal effects a counting cycle at counter 68 which is either too long or too short to produce the number of counts required to cause coincidence gate 76 to be triggered by the SAMPLE pulse. In this manner each receiver is truly selectively addressable on the basis of command signal duration.

While we have described and illustrated specific embodiments of our invention, it will be clear that variations of the details of construction which are specifically illustrated and described may be resorted to without departing from the true spirit and scope of the invention as defined in the appended claims.

We claim:

1. A communications system comprising:

a transmitter including:

a source of carrier signal;

means for deriving a command signal from said carrier signal, said command signal having a frequency which is a sub-multiple of the frequency of said carrier signal;

means for selectively modulating said carrier signal with said command signal; and means for transmitting said carrier signal modulated by said command signal;

at least one remote receiver including:

means for receiving the modulated carrier signal;

demodulator means for separating said command signal from the received carrier signal;

means for deriving from one of said received carrier signal and said separated command signal a reference signal having a frequency which is a direct function of said one of said received carrier signal and said separated command signal;

means for establishing from the other of said received carrier signal and said separated command signal a counter timing interval which is substantially longer than the period of said reference signal;

counter means for registering the number of cycles of said reference signal occurring during said counter timing interval; and control means actuable at the termination of said counter timing interval for providing a control signal only if the count in said counting means equals a predetermined number at the termination of said counter timing interval.

2. The system according to claim 1 wherein said receiver includes means for performing a predetermined function in response to said control signal.

3. The system according to claim 1 wherein said receiver includes means for muting said receiver in the absence of said control signal and for demuting said receiver in response to said control signal.

4. The system according to claim 1 wherein said control means includes:

means for providing a control pulse in response to registry of said predetermined count at said counter means at the termination of said counter time interval;

integrating means for charging in response to each control pulse and for discharging in the absence of a control pulse, the discharge rate of said integrating means being significantly slower than its charging rate; and threshold means responsive to a predetermined charge accumulated in said integrator means for providing said control signal.

5. The system according to claim 1 wherein said reference signal is derived from said received carrier signal, said means for deriving said reference signal comprising first frequency divider means responsive to said received carrier signal for providing said reference signal at a frequency which is a predetermined fraction of the carrier signal frequency.

6. The system according to claim 5 wherein said means for establishing said counter timing interval comprises further frequency divider means for providing a cyclic signal having a period equal to said counter timing interval whenever said command signal is separated from said carrier signal; said system including means responsive to said cyclic signal for resetting said counter means at the termination of each cyclic signal period.

7. The system according to claim 6 wherein said control means comprises:

sampling means responsive to said cyclic signal for providing a sample pulse at the termination of each cyclic signal period;

gating means responsive to said time-coincidence of said sample pulse and registry of said predetermined count at said counter means for providing a control pulse;

means responsive to provision of a predetermined number of said control pulses within a specified time for providing said control signal; and means for maintaining said control signal for a predetermined period of time after termination of said control pulses, said predetermined period of time being greater than the period of said cyclic signal.

8. The system according to claim 7 wherein said predetermined number of counts is determined by the relationship $TK_1/K_2$ where $K_1$ is the factor by which the frequency of said command signal is less than the frequency of said carrier signal, $K_2$ is the frequency division factor of said first frequency divider means, and T is the frequency division factor of said further frequency divider means.

9. The system according to claim 1 wherein said recurring timing interval is established by said separated command signal, said means for establishing including frequency divider means for providing a cyclic signal having a period equal to said counter timing interval whenever said command signal is separated from said carrier signal; said system including means responsive to said cyclic signal for resetting said counter means upon termination of each cyclic signal period.

10. The system according to claim 1 wherein said reference signal is derived from said separated command signal, said means for deriving said reference signal comprising means for shaping said separated command signal to provide a train of reference pulses at the frequency of said command signal.

11. The system according to claim 10 wherein said means for establishing said counter timing interval comprises frequency divider means responsive to the received carrier signal for providing a cyclic signal having a period equal to said counter time interval whenever said carrier signal is received; said system including means responsive to said cyclic signal and said reference signal for resetting said counter means at the termination of each cyclic signal period in which a command signal is separated from said carrier signal.

12. The system according to claim 11 wherein said control means comprises:

sampling means responsive to said reference signal and said cyclic signal for providing a sample pulse upon termination of each cyclic signal period during which a command signal is separated from said received carrier signal;

gating means responsive to time coincidence of said sample pulse and registry of said predetermined count at said counter means for providing a control pulse;

means responsive to provision of a predetermined number of said control pulses within a specified time for providing said control signal; and means for maintaining said control signal for a predetermined period of time after termination of said control pulses, said predetermined period of time being greater than the period of said cyclic signal.

13. The system according to claim 5 wherein said transmitter includes means for selectively varying the duration of modulation of said carrier signal by said command signal; and wherein said means for establishing said counter timing interval comprises: means for providing a predetermined signal level in response to separation of said command signal from said received carrier signal by said demodulator means and for inhibiting said predetermined signal level in the absence of separation of said command signal by said demodulator means; and means for resetting said counter means at the onset of said predetermined signal level and actuating said control means at the termination of said predetermined signal level.

14. The system according to claim 5 wherein said transmitter includes means selectively varying the duration of modulation of said carrier signal by said command signal; and wherein said means for establishing said counter timing interval comprises: means for resetting said counter means and actuating said control means at the onset of separation of said command from said received carrier by said demodulator means.

15. A receiver in a communications system of the type in which a carrier signal of frequency $f$ cycles per unit of time is selectively modulated by a command signal derived from said carrier signal and having a frequency $f/K_1$ cycles per unit of time, said receiver comprising:

means for receiving said modulated carrier signal;

means for deriving a reference signal at frequency $f/K_2$ cycles per unit of time from said received carrier signal;

counter means for counting cycles of said reference signal;

detector means for separating said command signal from said received carrier signal;

means for establishing a counter timing interval from said separated command signal, said counter timing interval having a duration $TK_1/f$ units of time; and control means for providing a control signal whenever the number of cycles of said reference signal counted by said counter means during a counter timing interval is equal to approximately $TK_1/K_2$ 16. The receiver according to claim 15 wherein said means for establishing comprises means for generating a repetitive signal of period $TK_1/f$ units of time whenever said command signal is separated from said received carrier signal; and wherein said control means comprises means for sampling the count in said counter means and resetting said counter means at a specified time during each cycle of said repetitive signal.

17. The receiver according to claim 15 wherein said means for establishing comprises means for generating a signal of predetermined level whenever said command signal is separated from said received carrier signal; and wherein said control means includes: means responsive to the onset of said predetermined level for resetting said counter means, means responsive to termination of said predetermined level for sampling the count in said counter means, and means for providing said control signal only if the time between onset and termination of said predetermined level is equal to $TK_1/K_2$ units of time.

18. The receiver according to claim 15 wherein said control means includes: means for sampling said counter means at each onset of separation of said command signal from said received carrier signal, means for resetting said counter means after each sampling thereof, and means for providing said control signal if the time between successive onsets of separation of said command signal is equal to $TK_1/K_2$ units of time.

19. In a communications system of the type where a transmitted signal is capable of selective modulation to demute specified remote receivers, a transmitter comprising:

a source of carrier signal;

means for deriving a command signal from said carrier signal, said command signal having a frequency which is a sub-multiple of the frequency of said carrier signal;

counter means for counting cycles of said command signal;

first means for modulating said carrier signal with said command signal only when the count in said counter means lies within a first range of counts; and second means for modulating said carrier signal with said command signal only when the count in said counter means lies within a second range of counts.

* * * * *